(12) United States Patent
de Graaff et al.

(10) Patent No.: US 10,716,428 B2
(45) Date of Patent: Jul. 21, 2020

(54) METHOD OF PREPARING A BEVERAGE AND A DEVICE FOR PREPARING A BEVERAGE

(71) Applicant: Koninklijke Douwe Egberts B.V., Utrecht (NL)

(72) Inventors: Gerbrand Kristiaan de Graaff, Utrecht (NL); Trevor Michael Wood, Utrecht (NL); William Roger Mainwaring-Burton, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 5 days.

(21) Appl. No.: 15/855,358

(22) Filed: Dec. 27, 2017

(65) Prior Publication Data

US 2018/0310754 A1    Nov. 1, 2018

Related U.S. Application Data

(63) Continuation of application No. PCT/NL2016/050464, filed on Jun. 30, 2016.

(30) Foreign Application Priority Data

Jul. 1, 2015    (NL) ...................... 2015069

(51) Int. Cl.
*A47J 31/44*    (2006.01)
*A47J 31/56*    (2006.01)
(Continued)

(52) U.S. Cl.
CPC ............. *A47J 31/4489* (2013.01); *A23L 2/54* (2013.01); *A23P 30/40* (2016.08); *A47J 31/56* (2013.01); *A23F 5/26* (2013.01); *A23V 2002/00* (2013.01)

(58) Field of Classification Search
CPC ....... A47J 31/4489; A47J 31/56; A23P 30/40; A23L 2/54; A23F 5/26
See application file for complete search history.

(56) References Cited

U.S. PATENT DOCUMENTS 6,118,104 A * 9/2000 Berkcan ............... H05B 1/0269
219/481
2003/0131735 A1    7/2003 Johnson et al.

FOREIGN PATENT DOCUMENTS

DE    19638355         4/1998
EP    2 764 806    * 8/2014    ............. A47J 31/52
(Continued)

OTHER PUBLICATIONS

California State Science Fair, Using Sound to Measure Temperature, [on line] 2005, no month given, retrieved Sep. 30, 2019. Retrieved from the Internet: URL:<http://cssf.usc.edu/History/2005/Projects/J1503.pdf>.*

(Continued)

*Primary Examiner* — Viren A Thakur
*Assistant Examiner* — Chaim A Smith
(74) *Attorney, Agent, or Firm* — Fitch, Even, Tabin & Flannery LLP

(57) ABSTRACT

A method of preparing a beverage, wherein the method comprises the step of heating a beverage in a cup by means of injecting steam into the beverage through a wand and the step of measuring the temperature of the beverage in the cup, wherein the step of measuring the temperature of the beverage comprises during the step of heating the step of continuously recording an audio signal from the beverage and the step of deriving the temperature of the beverage from the recorded audio signal. A device for preparing a beverage, said device being provided with a beverage temperature sensor comprising at least one microphone and a (Continued)

controller which is loaded with a computer program for performing the inventive method.

17 Claims, 9 Drawing Sheets

(51) Int. Cl.
    *A23P 30/40*     (2016.01)
    *A23L 2/54*     (2006.01)
    *A23F 5/26*     (2006.01)

(56) References Cited

FOREIGN PATENT DOCUMENTS

| EP | 2 764 806 A1 | 8/2014 |
| WO | WO-2017/003288 | 1/2017 |

OTHER PUBLICATIONS

Podesta, M, Practical scoustic thermometry: a new way to measure reactor temps, [on line} Mar. 2014, retrieved Oct. 1, 2019. Retrieved from the Internet: URL:<https://www.neimagazine.com/features/featurepractical-acoustic-thermometry-a-new-way-to-measure-reactor-temperatures-4203005/>.*

Podesta et al., The most accruate thermometer in the world, [on line] Apr. 2014, Retrieved Oct. 1, 2019. Retrieved from the Internet: URL:<https://www.stem.org.uk/system/files/elibrary-resources/legacy_files_migrated/31850-catalyst_24_3_572.pdf>.*

EP 2 276 806, Dollner, Aug. 2014, Machine Translation.*

International Search Report and Written Opinion, P103105US00, Koninklijke Douwe Egberts B.V., (Sep. 5, 2016).

International Preliminary Report on Patentability, dated Jan. 2, 2018 for International Application No. PCT/NL2016/050464 (5 pgs.).

European Search Report, dated Feb. 18, 2016 for NL 2015069 (5 pgs.).

* cited by examiner

METHOD OF PREPARING A BEVERAGE AND A DEVICE FOR PREPARING A BEVERAGE

CROSS-REFERENCE TO RELATED APPLICATIONS

This application is a continuation of PCT/NL2016/050464, filed Jun. 30, 2016, which claims the benefit of and priority to Netherlands Application No. NL 2015069, filed Jul. 1, 2015, the entire contents of each of which are incorporated herein by reference.

BACKGROUND

The invention relates generally to a method for preparing a beverage, wherein the method comprises the step of heating the beverage in a cup by means of injecting steam into the beverage through a wand and the step of measuring the temperature of the beverage in the cup.

Such a method is known from US-A1-2003/0131735. The known method is performed by a system comprising an elongate frothing wand that includes a generally tubular external sleeve and an inner core within the external sleeve. The inner core defines a steam conduit configured to pass steam from a supply end of the froth wand to an expulsion end of the froth wand configured to eject steam into the beverage. The inner core further includes a coupling mechanism, configured to facilitate connection of the froth wand to a steam supply of beverage preparation device. The coupling mechanism may include threads, clamps, grooves, quick connect mechanisms, or other suitable fasteners complementarily configured to connect with steam supply and allow for easy de-coupling and re-coupling of the frothing wand from the steam supply to facilitate maintenance and cleaning. In addition the external sleeve may be easily removed facilitating cleaning and repair. For example, the external sleeve may be easily removed after a beverage of one flavor is prepared, so as to minimize the risk of imparting an undesired flavor to a subsequently prepared beverage. In addition, several different external sleeves individually configured to accommodate specific functions may be interchangeably coupled to the frothing wand, thus diversifying the utility of the frothing wand. The frothing wand may include a temperature measuring instrument that is positioned near the center of the frothing wand. The temperature-measuring instrument may be a thermometer, thermistor or a thermocouple for measuring the temperature by contact with the frothed beverage. Measured temperatures may be indicated via a visual display and/or other visible or audible mechanism, and may be used to automatically control operation of the beverage preparation device. Although the known system allows for removing the froth wand in order to clean the froth wand, de-coupling and re-coupling of the froth wand including cleaning of the froth wand, in particular the cleaning of the temperature measuring instrument, requires a lot of time. In particular it is desirable from a hygienic point of view that the froth wand is de-coupled, cleaned and re-coupled each time it has been used and this makes the use of such a system somewhat impractical, with the result that users of the system frequently refrain from cleaning the froth wand after it has been used, which could lead to health risks. In addition, a contaminated froth wand may also contaminate the inside of the beverage preparation device, which inside device contamination may be hard to remove. In particular since the temperature measuring instrument comes into contact with the frothed beverage it is prone to contamination and needs thorough cleaning, which is labor intensive in view of its position in the frothing wand.

SUMMARY

It is therefore an object of the invention to provide a method for preparing a beverage, wherein the method comprises the step of heating the beverage by means of injecting steam into the beverage through a wand, in which the temperature of the beverage can be measured hygienically. It is furthermore an object of the invention to provide an alternative manner of measuring the temperature of a beverage in a method of preparing the beverage.

In order to achieve at least one of the above identified objects the invention provides a method of preparing a beverage using, wherein the method comprises the step of heating a beverage in a cup by means of injecting steam through a wand and the step of measuring the temperature of the beverage in the cup, wherein the step of measuring the temperature of the beverage comprises during the step of heating the step of continuously recording an audio signal from the beverage and the step of deriving the temperature of the beverage from the recorded audio signal. By recording the audio signal from the beverage and deriving the temperature of the beverage from the recorded audio signal, the temperature of the beverage can be measured contactless thereby improving the hygienic performance of the method. The invention is further based on the insight that during heating the beverage by means of injecting steam into the beverage through a wand the frequency of the sound coming from the beverage becomes lower in frequency as the temperature of the beverage increases. Without being bound by theory the invention is based on the insight that during injection of steam into the beverage via the wand or straw, bubbles are produced at the outlet of the wand or straw, which bubbles are mainly steam with a small amount of air. The steam bubbles are deemed to collapse when they come into contact with the beverage, as the steam condenses. This collapse of the bubbles results in a sound being emitted from the beverage, while the collapse rate determines the frequency of the sound. The collapse rate of the bubbles (volumetric change of a single bubble) is believed to be determined by the surface area of the bubble and the temperature difference driving the condensation. Assuming the injected steam is constantly at the same temperature, the temperature difference between the steam and the beverage being heated in time decreases as the beverage warms, which leads to a decreased bubble collapse rate and a change in the frequency of the emitted sound. The sound profile coming from the beverage heated by injection of steam is therefore affected by the temperature of the beverage and thus can be used to measure the temperature of the beverage.

In an embodiment of a method according to the invention the step of recording the audio signal from the beverage comprises sequentially loading in blocks of audio data. It is then preferred when the step of deriving the temperature from the recorded audio signal comprises processing each loaded block of audio data by performing a Fourier transform on each loaded block for providing an indicator value for each of said loaded blocks of audio data, said indicator value correlating with beverage temperature.

In an advantageous embodiment of a method according to the invention the step of deriving the temperature from the recorded audio signal comprises deriving an indicator vector, said indicator vector comprising a list of indicator vector values, in which the number of indicator vector values equals the number of loaded blocks of audio data, each specific indicator vector value being determined by the sum of the indicator value of the respective loaded block of audio data and the indicator vector value determined for the immediately preceding loaded block of audio data. Please note, that in this application the term "vector" or "list" also encompasses a "column", a "row" or an "array".

It is preferred that the indicator vector derived from the audio frequency spectrum strongly correlates with the temperature of the beverage. It is then preferred that in an embodiment of a method according to the invention after performing a Fourier transform on each loaded block the method comprises a step of determining the 15th-percentile of the audio frequency spectrum of the audio data in each loaded data block, i.e. the frequency below which 15% of the audio power is contained. By then taking a running average of the 15th-percentile of the audio frequency spectrum steam flow oscillations can be damped out. An additional or alternative indicator vector derived from the audio frequency spectrum which strongly correlates with the temperature of the beverage is obtained according to an embodiment of a method according to the invention wherein after performing a Fourier transform on each loaded block the method comprises the step of determining the audio signal power in a given frequency band. Preferably said given frequency band is the band from 0-750 Hz. By then taking a running average of the audio signal power in said given frequency band steam flow oscillations can be damped out. These two indicators, i.e. 15th-percentile of the audio frequency spectrum and the audio signal power in a given frequency band, show excellent correlation between the temperature and the audio signal input.

In a further embodiment of a method according to the invention the step of deriving the temperature from the recorded audio signal comprises the step applying a low pass filter to the indicator vector. Since the audio signal profile coming from the beverage heated by injection of steam is a probability distribution filtration by a low pass filter reduces or can avoid signal noise from contaminating the recorded audio signal.

In a still further embodiment of a method according to the invention the step of deriving the temperature from the recorded audio signal comprises the step of comparing the last indicator vector value of the indicator value to a threshold, and the step of deactivating heating the beverage when the last indicator vector value exceeds the threshold. In this manner by properly choosing the threshold values the average temperature can be maximized without allowing any overheating of the beverage. In an embodiment of a method according to the invention the threshold is a 550 Hz frequency percentile threshold, i.e. when 15% of the audio signal power is contained below 550 Hz. In another embodiment of a method according to the invention the threshold is 0-750 Hz frequency band power threshold, i.e. when 22% of the audio signal power is contained in the frequency band of 0-750 Hz.

In a still further embodiment of a method according to the invention the method comprises the step of setting a minimum heating time period, preferably a time period of 17 seconds, and the step of setting a maximum heating time period, preferably of 24 seconds. By setting a minimum heating time under-heating, due to oscillations and irregular noises at the start of the heating cycle, can be prevented. By setting a maximum heating time a safeguard is provided to prevent heating of the beverage to the point of boiling.

DESCRIPTION OF THE DRAWINGS

The invention further relates to a device for preparing a beverage by means of injecting steam into the beverage through a wand, said device including a steamer, a steam conduit connecting the steamer to a steam nozzle, a wand holder arranged for holding a wand at least in an operational position in the device in which the steam nozzle is in communication with a steam inlet of the wand, a controller operationally connected to the steamer for controlling the operation of the steamer and a beverage temperature sensor for sensing a temperature of the beverage in the cup, said temperature sensor being operationally connected to said controller for supplying thereto a signal indicative for the measured beverage temperature, wherein the beverage temperature sensor comprises at least one microphone and wherein the controller is loaded with a computer program for performing the method according to the invention. Preferably, said at least one microphone is a directional microphone in order to reduce external ambient noise. Furthermore it is advantageous when the device comprises internal audio shielding for shielding audio noise produced by components of the device, such as the steamer. Further features and advantages of the present invention will appear from reading the description which follows, provided by way of non-limiting example and with reference to the accompanying drawings, in which.

DETAILED DESCRIPTION

Figure 1:
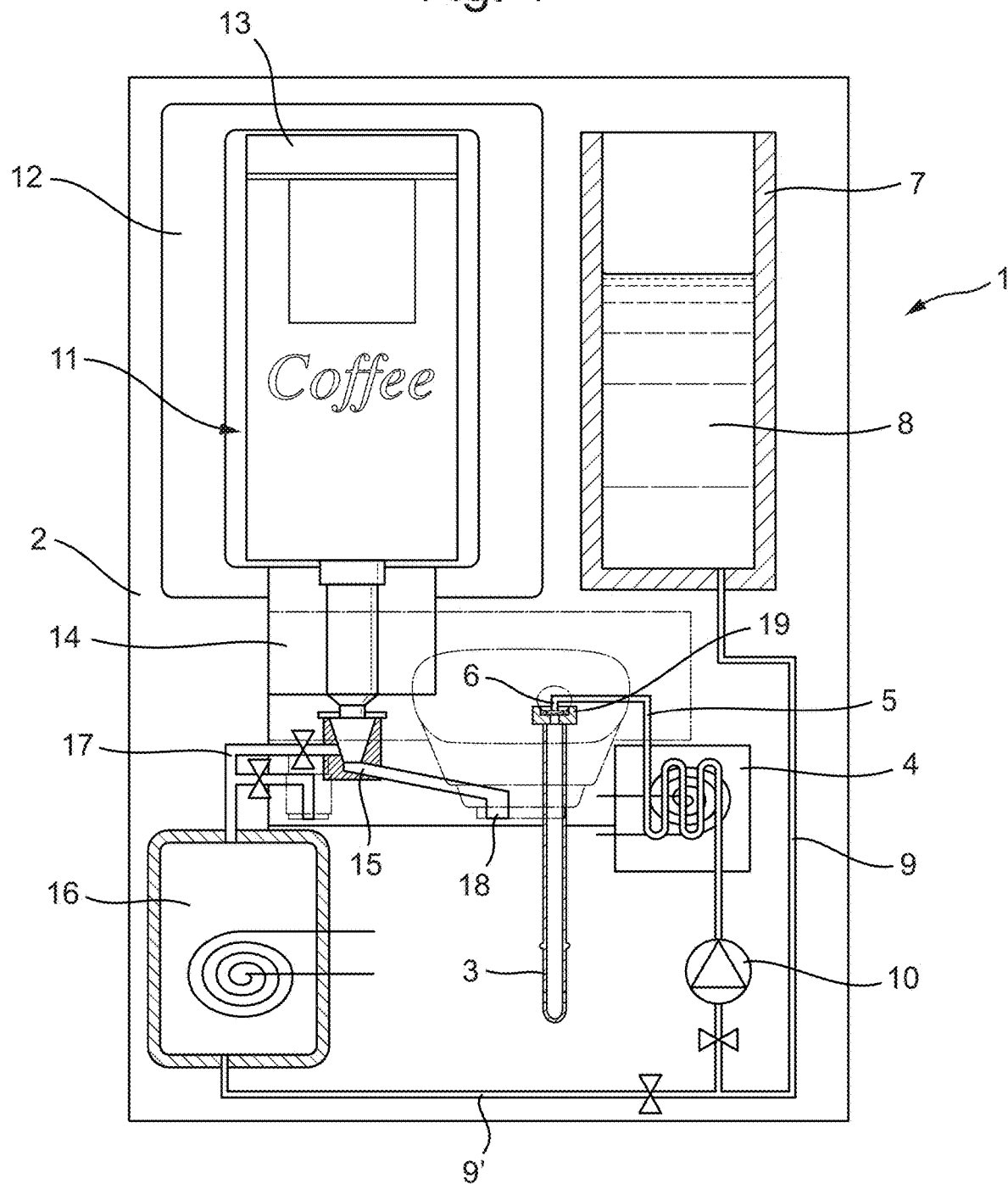
FIG. 1 schematically shows an embodiment of a device for preparing a beverage comprising a steamer for injecting steam into the beverage through a wand according to the invention in front view partly broken away.

In FIG. 1 an embodiment of a device 2 for preparing a beverage is schematically shown in front view partly broken away. In the shown embodiment the device 2 is arranged for heating and also frothing the beverage by injecting steam through a froth wand 3 coupled to the device 2

The device 2 includes a steamer 4, for example a thermoblock, and a steam conduit 5 connecting the steamer 4 to a steam nozzle 6. A reservoir 7 for cold water 8 is provided in the device 2, which cold water reservoir 7 is connected to the steamer 4 via a cold water conduit 9 and a cold water pump 10 for supplying cold water to the steamer 4.

In the embodiment shown in FIG. 1 the device 2 further comprises a liquid coffee dispenser 11 for dispensing liquid coffee. In the shown embodiment the liquid coffee dispenser 11 comprises a chamber 12 for receiving a package 13 of concentrated liquid coffee. The liquid coffee dispenser 11 further comprises a coffee dosing apparatus 14 for dosing an amount of concentrated liquid coffee into a mixing chamber 15. Heated water is supplied from a water heater 16 via a water conduit 17 to the mixing chamber 15 to dilute the concentrated liquid coffee to a liquid coffee having a more consumable concentration. This liquid coffee can be dispensed into a cup (not shown in FIG. 1) from a liquid coffee outlet 18. In the shown embodiment the water heater 16 is supplied with cold water from the cold water reservoir 7 by means of the cold water conduit 9 and an extension 9' thereof. In other embodiments the water heater 16 can be supplied with water from a water source separate from the cold water reservoir 7.

Figure 2:
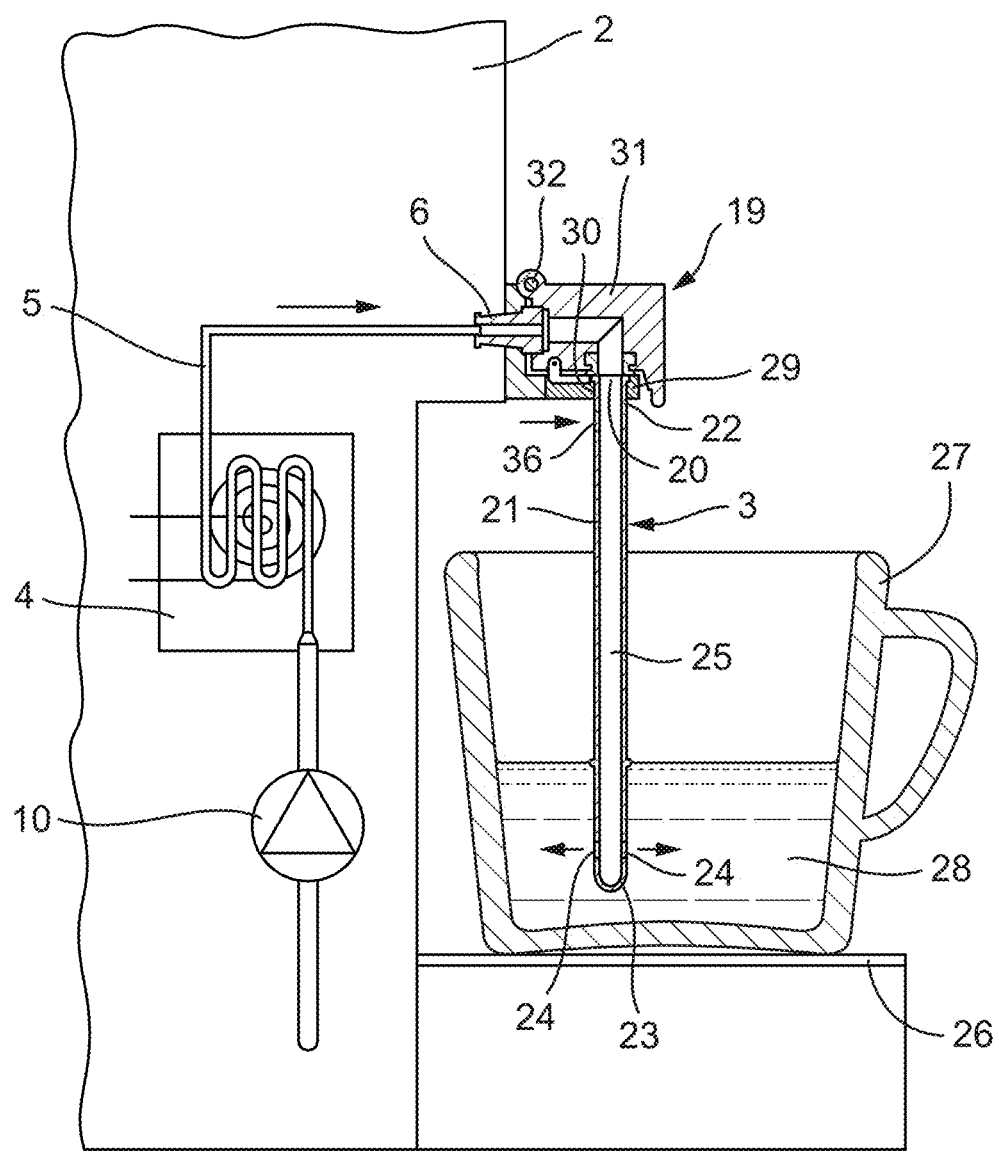
FIG. 2 schematically shows a part of the embodiment of FIG. 1 in side view with a cup placed on a cup support.

The device 2 further comprises a froth wand holder 19 for removably holding the froth wand 3. The froth wand holder 19 is arranged for holding the froth wand 3 at least in an operational position (as shown in FIG. 2) in the device 2 in which the steam nozzle 6 is in communication with a steam inlet 20 of the disposable froth wand 3. The froth wand holder 19 comprises a horizontal seat 29 for holding the froth wand 3. For this the horizontal seat 29 has a froth wand opening 30 for receiving a part of the froth wand 3. The froth wand holder 19 further comprises a lid 31 which is mounted displaceable relative to the horizontal seat 29. In the shown embodiment the lid 31 is mounted on a rotation shaft 32 so that it can be rotated away from the seat 29 so that a froth wand 3 can be placed in the froth wand opening 30 or taken out therefrom (the so called froth wand insertion position of the froth wand holder 19) or rotated towards the seat 29 to enclose a froth wand 3 positioned in the froth wand holder 19 which is then situated in the operational position.

The froth wand 3 is a disposable froth wand comprising a tubular wall 21 having a thickness of between 0.4 and 0.6 mm, preferably a 0.5 mm wall thickness, and having a steam inlet end 22 comprising the steam inlet 20, a steam outlet end 23 comprising at least one steam outlet 24 separate from the steam inlet 20 and a steam channel 25 having a diameter of between 4 mm and 10 mm extending between the steam inlet 20 and the steam outlet 24. In the embodiment shown in FIG. 2 the steam outlet 24 extends radially through the tubular wall 21. Furthermore the tubular wall 21 of the froth wand 3 comprises an air opening 36 extending through the wall. In the shown embodiment the air opening is slot shaped, the slot extending parallel to a longitudinal axis of the tubular wall 21. In other embodiments the air opening can be formed by one or more round holes.

The disposable froth wand 3 is made of biodegradable material.

In FIG. 2 it is further shown that the device 2, comprises a support 26 for a cup 27, and that the froth wand holder 19 and the support 26 are mutually arranged such that the froth wand 3 held in the froth wand holder 19 extends into the cup 27 positioned on the support 26 in the operational position of the froth wand holder. Indicated in FIG. 2 is further an amount of milk 28, as first beverage while the liquid coffee is also called second beverage in this description, and that the disposable froth wand 3 has a length between 100 and 120 mm, preferably 110 mm, such that the steam outlet 24 is positioned below the milk meniscus.

Referring to FIGS. 3A-3L a method of preparing a beverage comprising the step of heating the beverage by injecting steam into the beverage through a wand using the device 2 of FIGS. 1 and 2 will be described in the following.

Figure 3A:
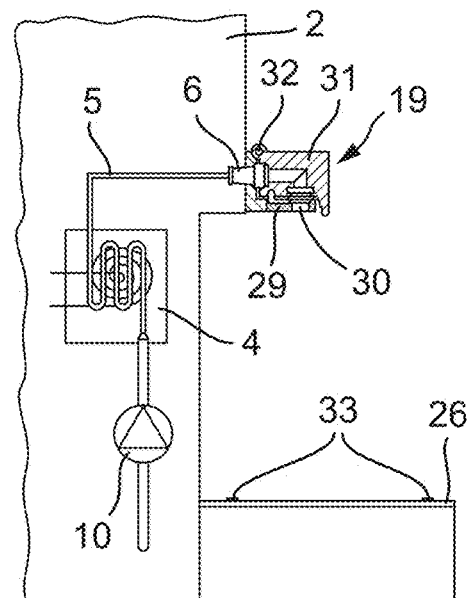
FIGS. 3A, 3B, 3C, 3D, 3E, 3F, 3G, 3H, 3I, 3J, 3K, and 3L schematically show the steps of a method of preparing a beverage wherein the method comprises the step of heating the beverage by means of injecting steam into the beverage through a wand using the device of FIGS. 1 and 2.
Figure 3B:
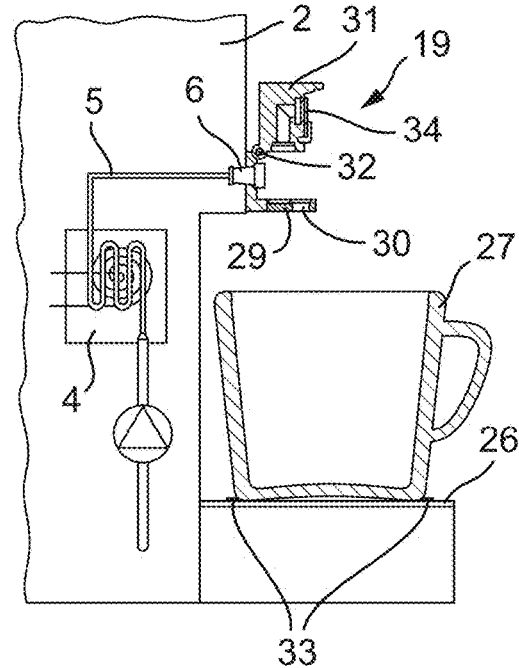
Figure 3C:
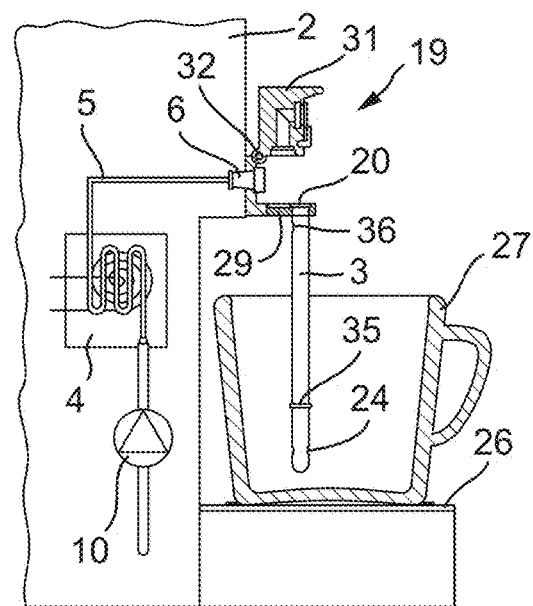
Figure 3D:
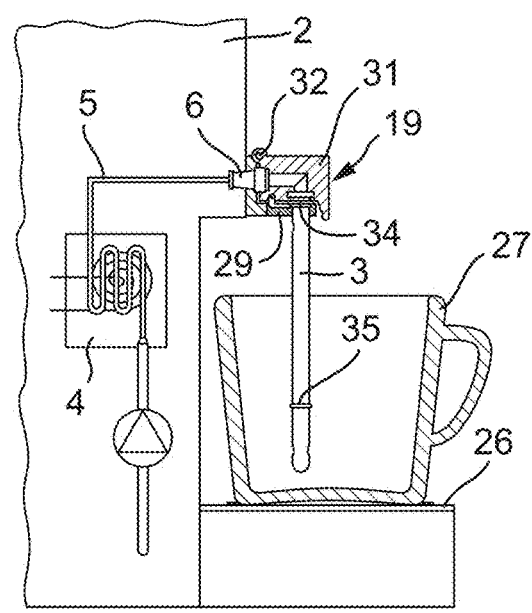
Figure 3E:
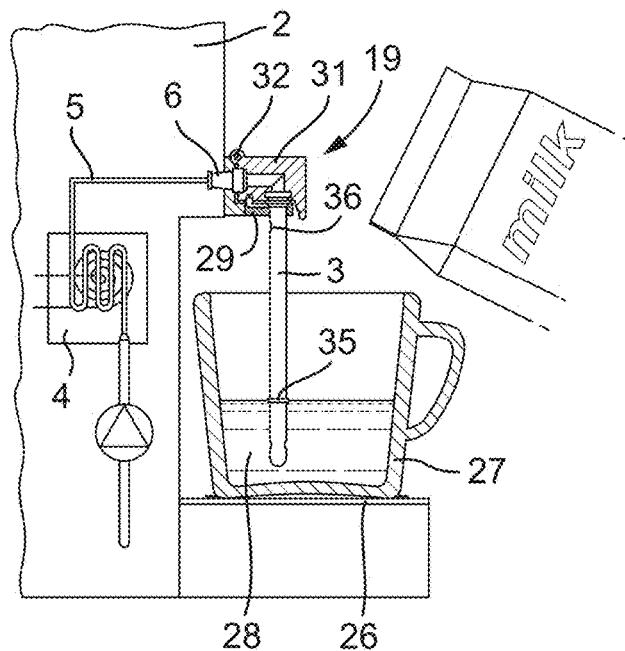

In FIG. 3A the start or rest position of the device 2 is shown in which the lid 31 is closed. To shorten the time period in which the beverage can be prepared the steamer or thermo block 4 is kept operative such that the water used for forming the steam is kept at an idle temperature of about 90° C. In the first step shown in FIG. 3B the lid 31 is opened by rotation around the rotation shaft 32 placing the froth wand holder 19 in the so-called froth wand insertion position, and a cup 27 is placed on the support 26. The device is arranged such that in this froth wand insertion position supply of steam is disabled. In order to provide a user with information where to place the cup 27 the support comprises position indicators 33, such as e.g. visual markings, indicating a central or off center position of the cup. A central position means that when a froth wand is held in the froth wand holder 19 the froth wand extends substantially centrally into the cup, in the off center position the froth wand will extend off center into the cup. In the second step shown in FIG. 3C a froth wand 3 is placed in the froth wand opening 30 of the froth wand holder 19 of the device 2 such that the froth wand 3 is held in the froth wand holder 19 in a substantially vertical position. In addition, in this so called operational position the steam nozzle 6 is in communication with the steam inlet 20 of the froth wand 3. In the third step shown in FIG. 3D the lid 31 is closed. The lid 31 comprises sealing means 34 which provides a seal with the upper edge of the froth wand 3 and in addition provides clamping of the froth wand 3. Please note that the device is arranged such that supplying steam is enabled only after the froth wand 3 is positioned in the froth wand holder 19 and more preferably when the lid 31 has been closed. In the fourth step shown in FIG. 3E the cup 27 is filled with a first beverage, such as milk 28, up to a fill indication mark 35 provided on the froth wand 3, such that the steam outlet 24 of the froth wand 3 extends into the milk 28.

Figure 3F:
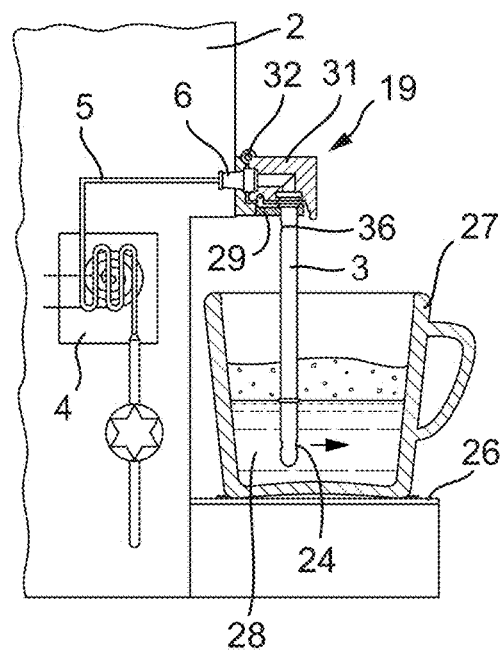
Figure 3G:
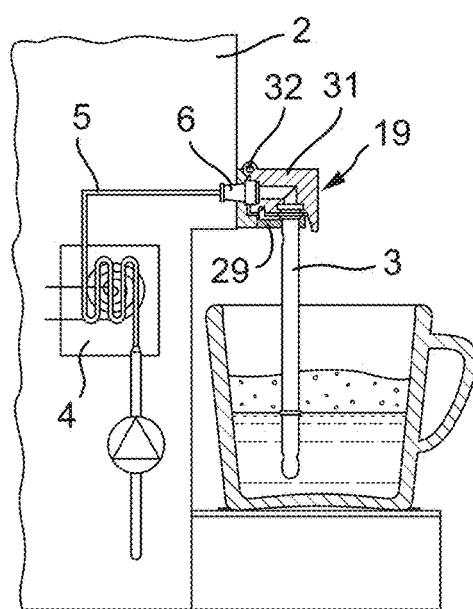
Figure 3H:
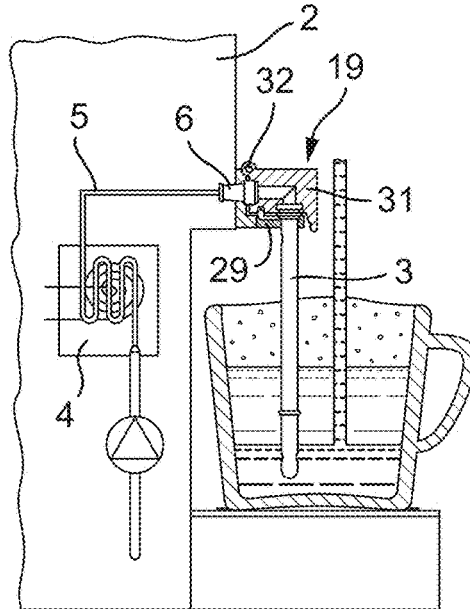
Figure 3I:
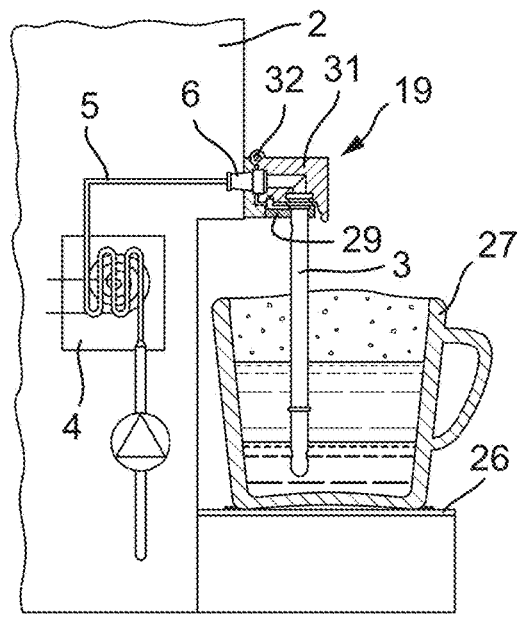
Figure 3J:
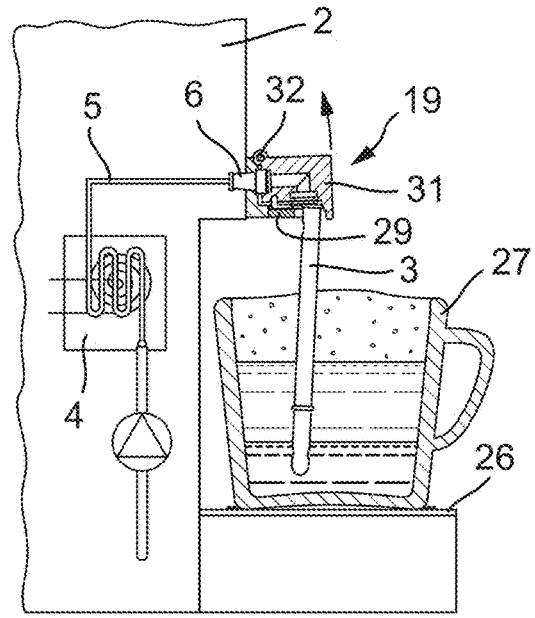

In the fifth step as shown in FIG. 3F the steamer 4 is activated and warms up the water further to produce steam which is then supplied to and through the froth wand 3 and into the milk 28 via the steam outlet 24. During steam supply cold water is fed from the cold water reservoir 7 (FIG. 1) to the steamer 4. During this supply of steam to and through the froth wand 3 air is sucked into the steam via the air slot 36. Supply of steam realizes the heating and frothing of the milk 28 and takes in this embodiment place during a predetermined period of time to sufficiently heat and froth the milk 28. After the time period has elapsed the steamer 4 is deactivated in the sixth step as shown in FIG. 3G. Then in the seventh step (FIG. 3H) the liquid coffee dispenser 11 is activated and coffee as a second beverage different from the first beverage is added into the cup 27 until the dosing of coffee is completed (FIG. 3I). If desired by the user the steamer 4 can be activated again to heat and froth the coffee/milk mixture. Please note that in other embodiments the coffee can be dispensed into the cup and optionally heated and frothed before the milk is poured into the cup 27 and heated and frothed. Please also note that in other embodiments air can be introduced in the steam by an air pump present in the device 2 for introducing air into the flow of steam as alternative to or in addition to the air slots 36.

Figure 3K:
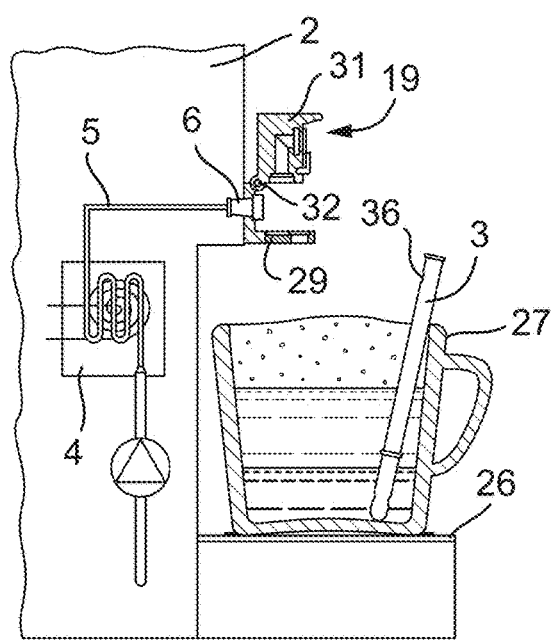
Figure 3L:
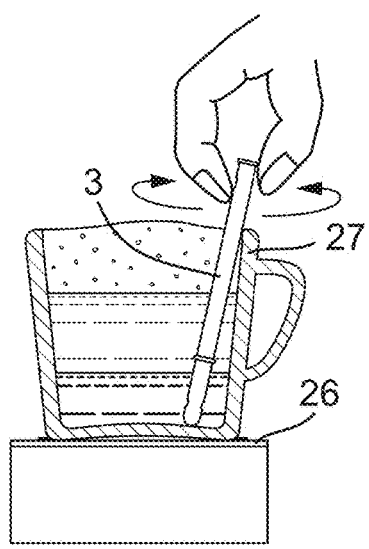

In the following step the lid 31 is opened (indicated by the arrow in FIG. 3J) and finally reaches the froth wand insertion position, thereby releasing the froth wand 3 from the froth wand holder 19. Which in the shown embodiment can be manually taken out of the froth wand holder 19 as shown in FIG. 3K. If desired the froth wand 3 can be used as stirrer (FIG. 3L) after the froth wand 3 has been released and the user can consume the prepared beverage and thereafter dispose of the froth wand 3.

In the embodiment shown in FIG. 3 the froth wand 3 is disposed when it is used only once. Amongst others things dependent on the frequency the device is used to heat and froth a beverage the froth wand 3 can be used more than once but from a hygienic point of view number of times a froth wand is used should preferably be less than five.

The device 2 for preparing a beverage comprises a controller 73 which is operationally connected to amongst other things the steamer 4 for controlling the operation of the steamer. In addition the controller 73 is operationally connected to the cold water pump 10 for controlling the operation of the cold water pump. The device 2 further includes a beverage temperature sensor 87A-87C (FIG. 2) for sensing a temperature of beverage 28 on the top surface of which froth 28A is formed. The temperature sensor 87A-87C is operationally connected to the controller 73 for supplying thereto a signal indicative for the measured beverage temperature. The beverage temperature sensor comprises at least one microphone (87A-87C) which can be positioned above (87A) the cup 27, beside (87B) the cup 27 above the upper edge 27A of the cup 27 or beside (87C) the cup below the upper edge 27A of the cup 27. Measuring the temperature of the beverage 28 then includes recording an audio signal (sound) from the beverage 28 and the step of deriving the temperature from the recorded audio signal by means of a suitable computer algorithm stored in the controller 73. Depending on the measured temperature the controller 73 can then decide whether or not to deactivate the steamer 4, in particular using specific threshold values. The controller 73 therefore controls the method of heating and frothing and preparing a beverage based on information gathered by the respective microphone(s) 87.

Figure 4:
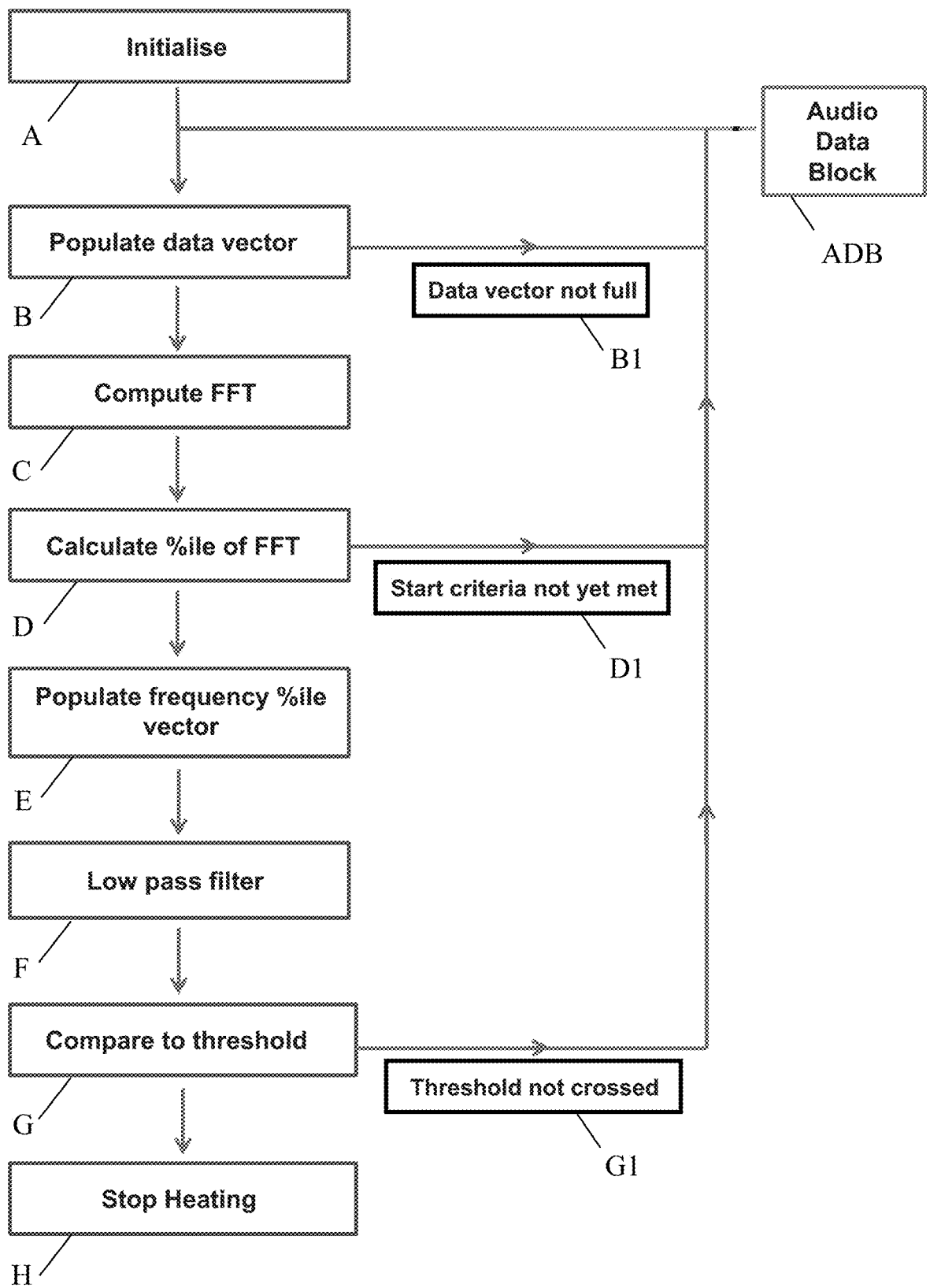
FIG. 4 schematically shows a flow diagram of a method according to the invention.

The algorithm will be described with reference to FIG. 4. In block A initialization takes place. This algorithm initialization involves setting the parameters and initializing the device state. The key parameters are the 15th-percentile value of the audio frequency spectrum of the audio data in each loaded data block, i.e. the frequency below which 15% of the audio power is contained, for FFT distribution denoted P (i.e. 15) and the frequency threshold, T, which is a 550 Hz frequency percentile threshold, i.e. when 15% of the audio signal power is contained below 550 Hz. The device (controller 73) states to be initialized include: setting the time setting to 0, setting the waiting flag to true and setting the data vector and the frequency percentile vector to empty.

During recording sound or audio data blocks (ADB) are sequentially added to populate the data list or vector as shown in block B. Each audio data block e.g. represents a predetermined number of seconds (e.g. 0.2 seconds) of recorded sound and contains 4096 samples. A new data block is added to the end of the data list or vector already present. If the combined data vector is too long, and equivalent amount is removed from the beginning of the data vector. If the combined data vector is too short, the next audio block is awaited (block B1).

When the data list or vector is populated the FFT of the data vector is computed as shown in block C. The sum of the absolute values for the whole FFT is computed and denoted by the value M. The FFT is reduced to its relevant subset (as determined by the algorithm parameters) and this value is normalized so that it sums to zero. This value is denoted FFTvec.

Thereafter the FFT Percentile for each data block in the data list or vector is calculated as shown in block D, for providing an indicator value for each of said loaded blocks of audio data. Please note that the indicator value correlates with beverage temperature. In this calculation the frequency value, F, is calculated such that the sum of the signal below this value is P/100. (This means that F is the Pth percentile of FFTvec, wherein in this embodiment P is 15). This emphasizes the main trend in frequency shift during heating and de-emphasizes surrounding noise.

At this point, if the waiting flag is set to true the start criteria is tested (block D1). The starting criteria are the following: M is greater than a minimum volume threshold (this ensures that the device is on) and F>T+C, where C is a 'cushion'. If the start criteria is met, the waiting flag is set to false (i.e. this criteria does not need to be tested again). If the criteria is not met, then the next audio data block is awaited.

Thereafter Frequency Percentile vector or list is populated as shown in block E. The value F is added to the end of the Frequency Percentile Vector, in other words the Frequency Percentile vector is an indicator vector which comprises a list of indicator vector values, in which the number of indicator vector values equals the number of loaded blocks of audio data. Each specific indicator vector value is determined by the sum of the indicator value of the respective loaded block of audio data and the indicator vector value determined for the immediately preceding loaded block of audio data.

Figure 6:
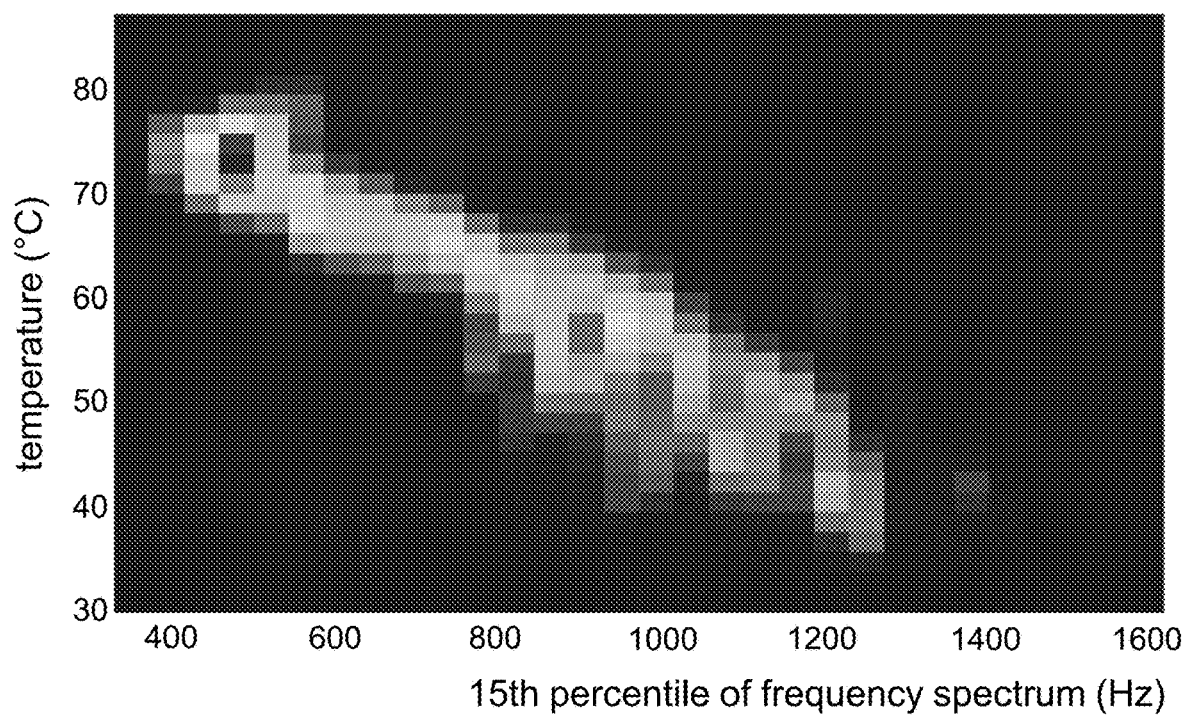
FIG. 6 shows an example of the 15th percentile of Frequency spectrum.
Figure 8:
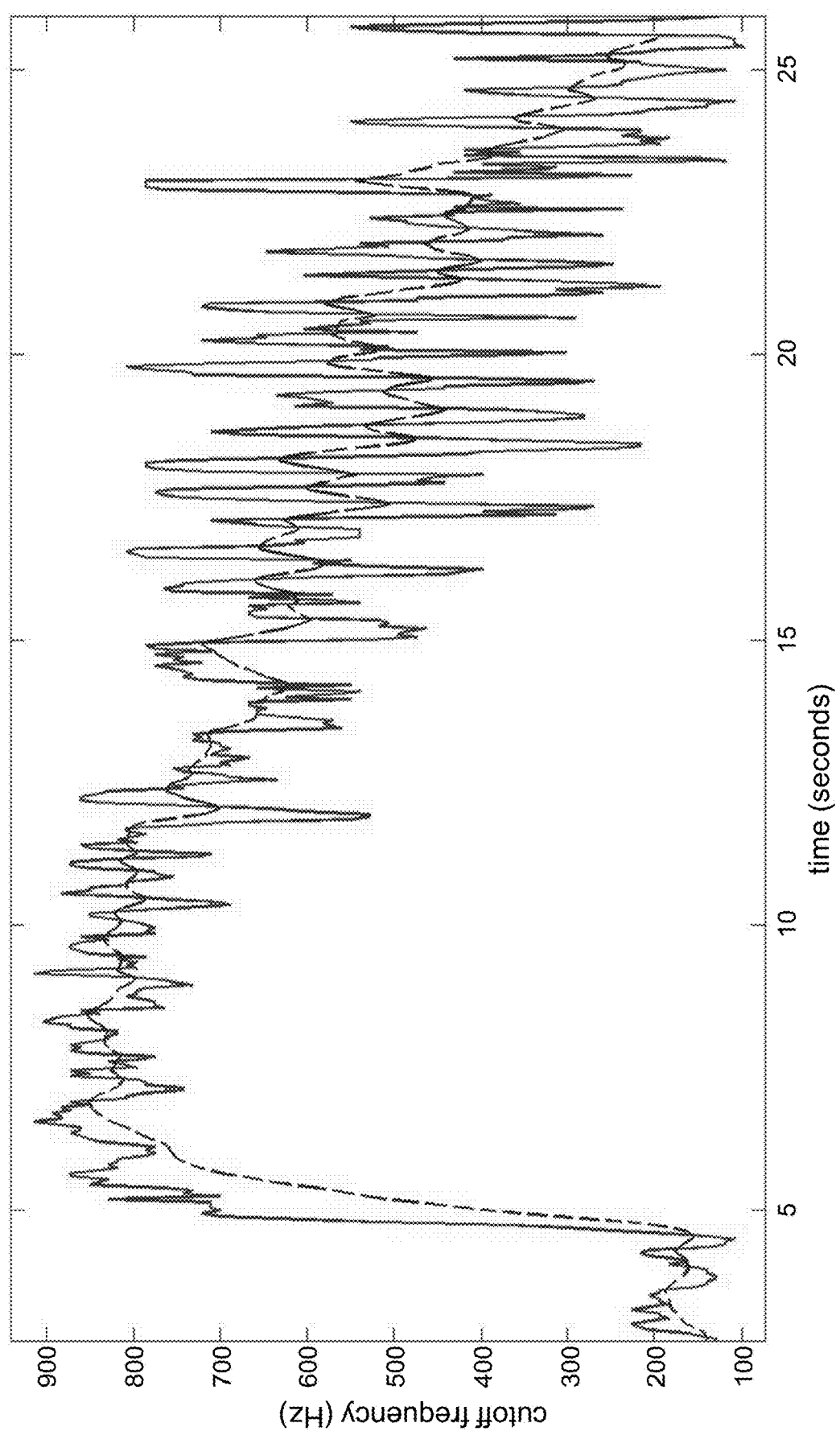
FIG. 8 shows a comparison of the indicator vector with and without low pass filtering.

The whole Frequency Percentile Vector is low pass filtered as shown in block F. This process removes the short timescale features of the data (which are generally noise related) and emphasizes the general frequency trend during heating, which is indicated in FIG. 6 and which is clearly visible in FIG. 8, in which the indicator value with low pass filtering is indicated by the dotted line and the indicator value without low pass filtering is indicated by the solid line. In addition, applying low pass filtering prevents the indicator threshold from being triggered by transient noise.

If the last element of the Frequency Percentile Vector is lower than T (i.e. the 550 Hz frequency percentile threshold corresponding to a set temperature) as determined by the comparison step in block G, the stopping criteria are met and the heating is stopped (block H) by sending an appropriate signal from the controller 73 to the steamer 4. If the threshold is not crossed (block G1), the next audio data block ADB is awaited.

Thus the algorithm structure generally includes the following steps:

Step 1. Load in blocks of audio data sequentially and perform a Fourier transform.

Step 2. Derive an indicator of low frequency content and a growing indicator list or vector containing all indicator values.

Step 3. Perform transformations on the indicator vector; and

Step 4. Compare indicator to threshold for "low enough" frequency spectrum.

Figure 7:
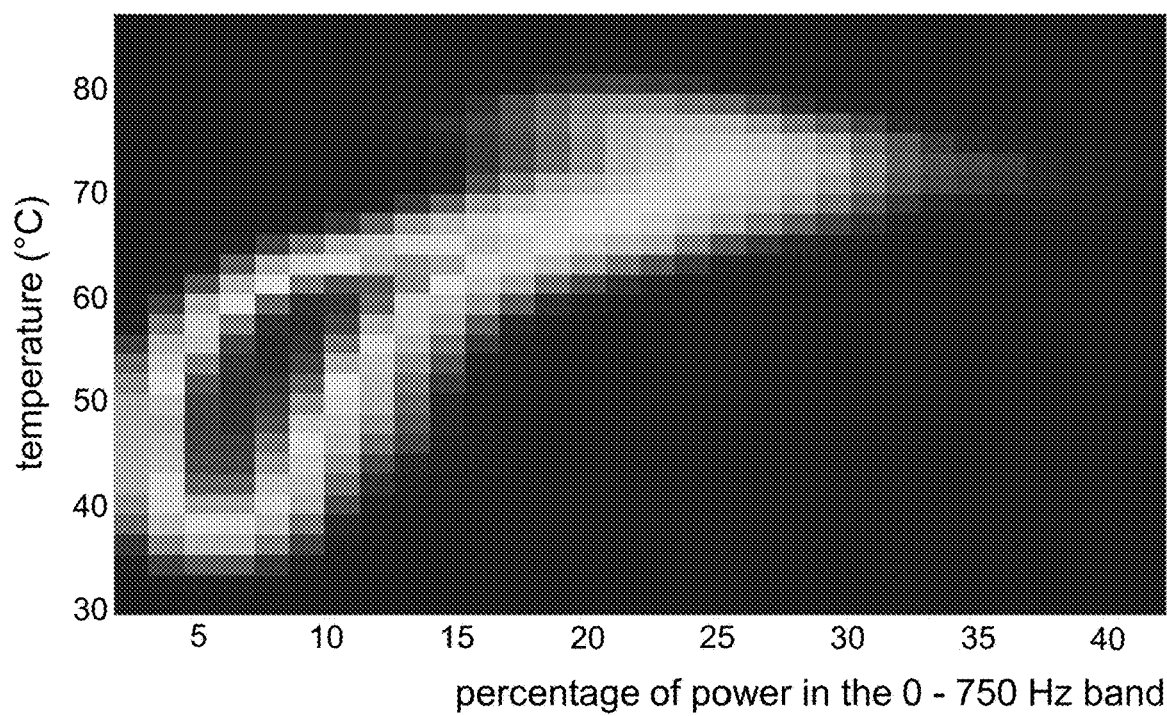
FIG. 7 shows an example of the percentage of power in the 0-750 Hz band.

In accordance with another embodiment of the invention the algorithm initialization involves setting a given frequency band in which the percentage of power with regard to the complete audio signal is to be determined, in particular the band from 0-750 Hz for FFT distribution and setting the 22% frequency band power threshold, i.e. when 22% of the audio signal power is contained in the frequency band of 0-750 Hz. The other steps of the method are analogous to the ones described in FIG. 4 and a resulting graph of percentage power in the 0-750 Hz frequency band is shown in FIG. 7.

Figure 5:
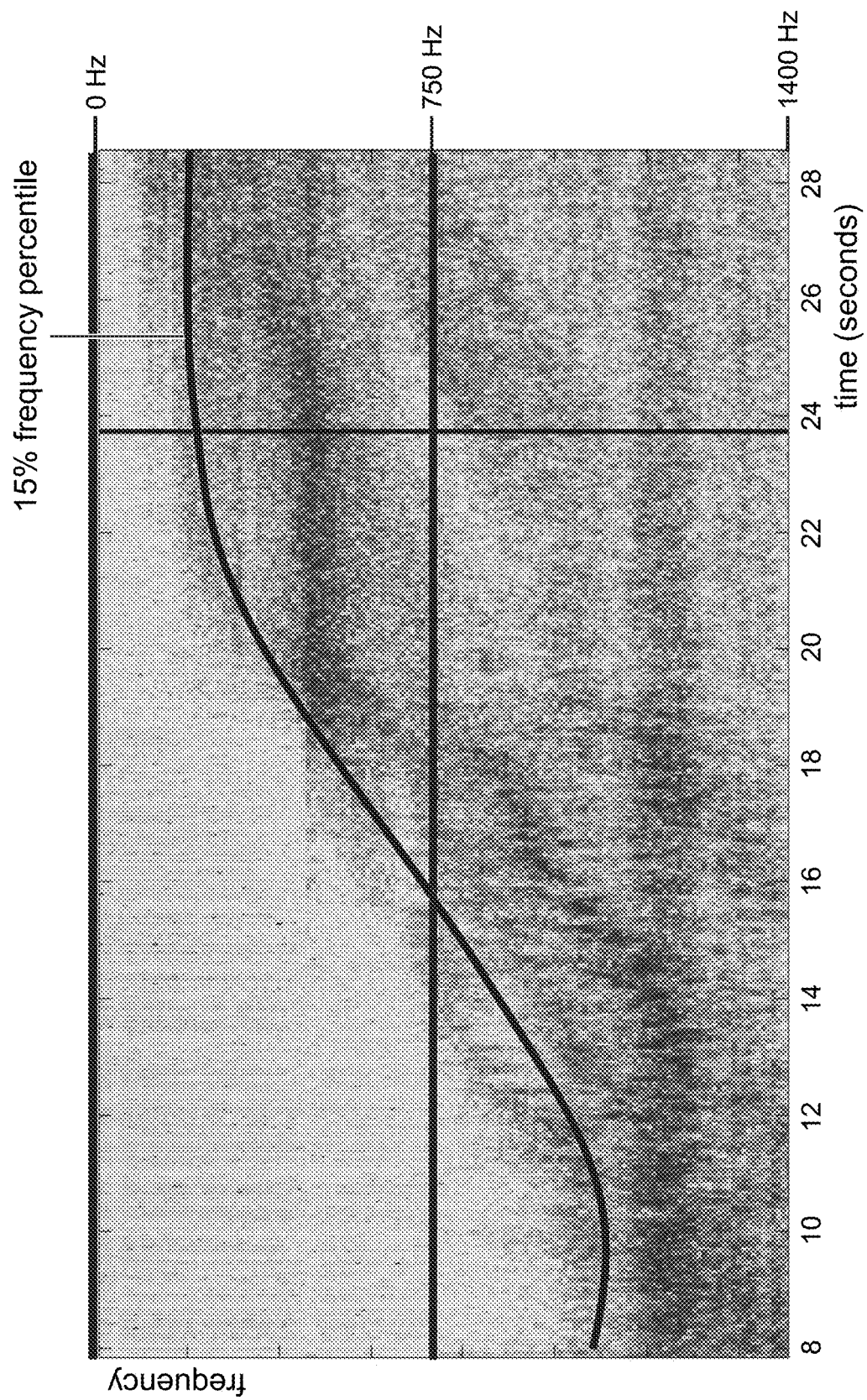
FIG. 5 shows an example of an audio sample spectrum representing the indicators.

In FIG. 5 an example of an audio sample spectrum representing the indicators is shown.

Please note that in both cases as an additional step the running average of the indicator can be taken for damping out steam flow oscillations. In a still further embodiment during initialization or as a permanent setting a minimum heating time period, preferably a time period of 17 seconds, and a maximum heating time period, preferably of 24 seconds, can be set.

In addition to measuring the temperature of the beverage the recorded audio signal can be used for different purposes, in particular regarding safety of use. It is for example possible to use the recorded audio signal to determine whether or not a cup is present, since the frequency spectrum of the audio signal during injecting steam for the situation when a cup is present differs from the situation where the cup is absent. The recorded audio signal can also be used to detect a very low fill level of the cup, since a very low fill level produces a audio signal which is different from the audio signal produced when a normal fill level is used, since when the fill level is very low the outlet orifice is above the surface of the beverage. In case a very low fill level is detected this can be indicated to the user, which e.g. can add more beverage. On the other hand the recorded audio signal can be used to detect a very high fill level, since a very high fill level will result in very slow heating, and this can be detected by monitoring the rate at which the temperature is changing. In case a very high fill level is detected this can be indicated to the user, which e.g. can remove some beverage from the cup. In addition the recorded sound can be used to detect a high starting temperature (above 55° C.) of the beverage and thus can be used to prevent users from double heating the beverage or the system. In addition, the recorded audio signal can be used to detect wear and tear of the device or to detect some defect, e.g. no steam is generated.

The invention claimed is:

1. A method of preparing a beverage, wherein the method comprises the step of heating the beverage in a cup by means of injecting steam into the beverage through a wand and the step of measuring the temperature of the beverage in the cup, wherein the step of measuring the temperature of the beverage comprises during the step of heating the step of continuously recording an audio signal from the beverage and the step of deriving the temperature of the beverage from the recorded audio signal.

2. The method according to claim 1, wherein the step of recording the audio signal from the beverage comprises sequentially loading in blocks of audio data.

3. The method according to claim 2, wherein the step of deriving the temperature from the recorded audio signal comprises processing each loaded block of audio data by performing a Fourier transform on each loaded block for providing an indicator value for each of said loaded blocks of audio data, said indicator value correlating with beverage temperature.

4. The method according to claim 3, wherein the step of deriving the temperature from the recorded audio signal comprises deriving an indicator vector, said indicator vector comprising a list of indicator vector values, in which the number of indicator vector values equals the number of loaded blocks of audio data, each specific indicator vector value being determined by the sum of the indicator value of the respective loaded block of audio data and the indicator vector value determined for the immediately preceding loaded block of audio data.

5. The method according to claim 4, wherein the step of deriving the temperature from the recorded audio signal comprises the step of applying a low pass filter to the indicator vector.

6. The method according to claim 5, wherein the step of deriving the temperature from the recorded audio signal comprises the step of comparing the last indicator vector value of the indicator vector to a threshold, and the step of deactivating heating the beverage when the last indicator vector value exceeds the threshold.

7. The method according to claim 6, wherein after performing a Fourier transform on each loaded block the method comprises a step of determining the 15th-percentile of the audio frequency spectrum of the audio data in each loaded data block, wherein the threshold is a 550 Hz frequency percentile threshold, i.e. when 15% of the audio signal power is contained below 550 Hz.

8. The method according to claim 6, wherein after performing a Fourier transform on each loaded block the method comprises the step of determining the audio signal power in a given frequency band, wherein the threshold is 0-750 Hz frequency band power threshold, when 22% of the audio signal power is contained in the frequency band of 0-750 Hz.

9. The method according to claim 3, wherein after performing a Fourier transform on each loaded block the method comprises a step of determining the 15th-percentile of the audio frequency spectrum of the audio data in each loaded data block, i.e. the frequency below which 15% of the audio power is contained.

10. The method according to claim 9, wherein the method comprises the step of taking a running average of the 15th-percentile of the audio frequency spectrum.

11. The method according to claim 3, wherein after performing a Fourier transform on each loaded block the method comprises the step of determining the audio signal power in a given frequency band.

12. The method according to claim 11, wherein the given frequency band is the band from 0-750 Hz.

13. The method according to claim 11, wherein the method comprises the step of taking a running average of the audio signal power in said given frequency band.

14. The method according to claim 1, wherein the method comprises the step of setting a minimum heating time period, and the step of setting a maximum heating time period.

15. A device for preparing a beverage, said device including a steamer, a steam conduit connecting the steamer to a steam nozzle, a wand holder arranged for holding a wand at least in an operational position in the device in which the steam nozzle is in communication with a steam inlet of the wand, a controller operationally connected to the steamer for controlling the operation of the steamer and a beverage temperature sensor for sensing a temperature of the beverage in the cup, said beverage temperature sensor being operationally connected to said controller for supplying thereto a signal indicative for the measured beverage temperature, wherein the beverage temperature sensor comprises at least one microphone and wherein the controller is loaded with a computer program for performing the method according to claim 1.

16. The device according to claim 15, wherein said at least one microphone is a directional microphone.

17. The device according to claim 15, wherein the device comprises internal audio shielding for shielding audio noise produced by components of the device, such as the steamer.

* * * * *